United States Patent
Khan et al.

(10) Patent No.: US 11,068,296 B2
(45) Date of Patent: Jul. 20, 2021

(54) VIRTUALISED SOFTWARE APPLICATION PERFORMANCE

(71) Applicant: British Telecommunications Public Limited Company, London (GB)

(72) Inventors: Kashaf Khan, London (GB); Newland Andrews, London (GB)

(73) Assignee: British Telecommunications Public Limited Company, London (GB)

( * ) Notice: Subject to any disclaimer, the term of this patent is extended or adjusted under 35 U.S.C. 154(b) by 139 days.

(21) Appl. No.: 16/494,201

(22) PCT Filed: Mar. 13, 2018

(86) PCT No.: PCT/EP2018/056295
§ 371 (c)(1),
(2) Date: Sep. 13, 2019

(87) PCT Pub. No.: WO2018/167093
PCT Pub. Date: Sep. 20, 2018

(65) Prior Publication Data
US 2020/0012509 A1   Jan. 9, 2020

(30) Foreign Application Priority Data

Mar. 14, 2017 (EP) .................................... 17160872

(51) Int. Cl.
*G06F 9/455* (2018.01)
*G06N 20/00* (2019.01)
*G06F 9/50* (2006.01)

(52) U.S. Cl.
CPC ........ *G06F 9/45558* (2013.01); *G06F 9/5016* (2013.01); *G06F 9/5027* (2013.01); *G06F 9/5077* (2013.01); *G06N 20/00* (2019.01); *G06F 2009/45562* (2013.01); *G06F 2009/45579* (2013.01); *G06F 2009/45583* (2013.01)

(58) Field of Classification Search
CPC .................................................. G06F 9/45558
See application file for complete search history.

(56) References Cited

U.S. PATENT DOCUMENTS

| | | |
|---|---|---|
| 2010/0085975 A1 | 4/2010 | Wang |
| 2015/0039744 A1 | 2/2015 | Niazi |
| 2015/0199207 A1 | 7/2015 | Lin |

(Continued)

FOREIGN PATENT DOCUMENTS

WO   WO 2018/167092   9/2018

OTHER PUBLICATIONS

Application and Filing Receipt for U.S. Appl. No. 16/494,227, filed Sep. 13, 2019, Inventor Khan.

(Continued)

*Primary Examiner* — Charlie Sun
(74) *Attorney, Agent, or Firm* — Patterson Thuente Pedersen, P.A.

(57) ABSTRACT

A method of improving performance of a software application executing with a virtualized computing infrastructure wherein the application has associated: a hypervisor profile of characteristics of a hypervisor in the infrastructure; a network communication profile of characteristics of network communication for the application; a data storage profile of characteristics of data storage for the infrastructure; and an application profile defined collectively by the other profiles.

13 Claims, 4 Drawing Sheets

(56) References Cited

U.S. PATENT DOCUMENTS

2016/0275412 A1 9/2016 Lu
2016/0306675 A1 10/2016 Wiggers

OTHER PUBLICATIONS

International Search Report and Written Opinion, Application No. PCT/EP2018/056294, dated Apr. 24, 2018, 10 pages.

International Preliminary Report on Patentability, Application No. PCT/EP2018/056294, dated Sep. 17, 2019, 8 pages.

International Search Report and Written Opinion, Application No. PCT/EP2018/056295, dated Apr. 6, 2018, 10 pages.

International Preliminary Report on Patentability, Application No. PCT/EP2018/056295, dated Sep. 17, 2019, 7 pages.

Altman, N.S., *An Introduction to Kernel and Nearest Neighbor Nonparametric Regression*, Cornell University, 32 pages, Jun. 1991.

Li, Wenchao, *A New Intrusion Detection System Based on KNN Classification Algorithm in Wireless Sensor Network*, Hindawi Publishing Corporation, Journal of Electrical and Computer Engineering, vol. 2014, Article ID 240217, 8 pages.

Liu, Huan, *Feature Selection: for Knowledge Discovery and Data Mining*, Springer Science + Business Media, LLC, 225 pages, © 1998.

Salton, G., *A Vector Space Model for Automatic Indexing*, Cornell University, Nov. 1975, vol. 18, Nov. 11, 8 pages.

Chiang, Ron, *Matrix: Achieving Predictable Virtual Machine Performance in the Clouds Matrix: Achieving Predictable Machine Performance in the Clouds*, Proceedings of the 11$^{th}$ International Conference on Automatic Computing, Jun. 18-20, 2014, pp. 45-56.

Farahnakian, Fahimeh, *Energy Aware Consolidation Algorithm Based on K-Nearest Neighbor Regression for Cloud Data Centers*, 2013, IEEE, pp. 256-259.

Zhang, Jian, *Adaptive Predictor Integration for System Performance Prediction*, 2014, IEEE, pp. 1-10.

VIRTUALISED SOFTWARE APPLICATION PERFORMANCE

CROSS-REFERENCE TO RELATED APPLICATION

The present application is a National Phase entry of PCT Application No. PCT/EP2018/056295, filed Mar. 13, 2018, which claims priority from European Patent Application No. 17160872.2 filed Mar. 14, 2017, each of which is fully incorporated herein by reference.

TECHNICAL FIELD

The present disclosure relates to improving the performance of a software application and, in particular, a software application executing with a virtualized computing infrastructure.

BACKGROUND

Software applications are increasingly deployed to operate with virtualized computing infrastructures such as cloud computing environments using network-connected virtualized computing systems, components and resources. Such infrastructures include: the provision of virtual machines as virtualized computing systems managed by virtual machine management components such as one or more hypervisors; the provision of storage such as virtualized storage facilities including virtualized disks at the like; and the provision of facilities for network communication such as virtualized network interfaces providing communication via network communication means such as wide area networks (WANs), internetworks and the like. Virtualized computing infrastructure depends on the provision of physical computing infrastructure which is provisioned, allocated and prioritized according to configurations managed by management entities such as hypervisors, operating systems, hypervisor management components, network management components and storage management components.

The performance of an application executing with a virtualized computing infrastructure can vary depending on the provision of physical and virtual resources across all of: virtualized machines; virtualized storage resources; and virtualized network resources for the infrastructure and for the particular application. Furthermore, a configuration of the virtualized computing infrastructure can affect performance including an allocation and prioritization of allocation and use of physical and/or virtual resources between one or more virtualized resources and/or applications. Furthermore, configuration optimization techniques can be employed to improve or balance performance of one or more applications executing with a virtualized computing infrastructure or a plurality of such infrastructures operating with a set of physical computing resources.

The range of different types of physical and virtualized resource and different resources for which implementation and configuration is required and/or possible along with the range of potentially different applications and infrastructure arrangements deployed with such resources leads to a large number of deployment and configuration options for an application.

Firstly, there are challenges identifying an application that is underperforming and underperformance is not necessarily readily apparent for an application such as an enterprise application. In order to identify such underperformance it is necessary to specifically determine one or more metrics of performance and to deploy techniques and dedicate resources to the measurement of performance in accordance with the metrics. Furthermore, predetermination of rules defining underperformance is required in order to identify underperformance.

Secondly, even where underperformance can be identified, providing for performance improvement is challenging in view of the large number of potential variables in a virtualized computing infrastructure across all of: the application configuration; hypervisor configuration; virtual machine configuration; storage configuration; and network configuration. A trial-and-error approach to affecting configuration changes or optimization measures can be employed which is both time consuming and provides little promise of success.

SUMMARY

It would be beneficial to address these challenges to identify an underperforming application executing with a virtualized computing infrastructure and to provide performance improvements for the application.

The present disclosure accordingly provides, in a first aspect, a method of improving performance of a software application executing with a virtualized computing infrastructure wherein the application has associated: a hypervisor profile of characteristics of a hypervisor in the infrastructure; a network communication profile of characteristics of network communication for the application; a data storage profile of characteristics of data storage for the infrastructure; and an application profile defined collectively by the other profiles, the method comprising: training a classifier to generate a first classification using training data sets based on application profiles so as to classify an application profile as underperforming; training the classifier to generate a set of second classifications and a set of third classifications using training data sets based at least one of: an application profile; a hypervisor profile; a network communication profile; and a data storage profile, wherein the classifications in the second set classify a profile for which optimization will provide improved application performance, and wherein the classifications in the third set classify a profile for which additional infrastructure resource is required to provide improved application performance; implementing one or more of: optimization of a hypervisor, network and/or data storage; and/or deploying additional resource for the hypervisor, network and/or data storage for the application in response to applying the first, second and third classifications to data sets based on the profiles for the application.

The present disclosure accordingly provides, in a second aspect, a method of improving performance of a software application executing with a virtualized computing infrastructure using a classifier including a machine learning algorithm to classify data sets corresponding to profiles of characteristics of the application and the virtualized computing infrastructure, the virtualized computing infrastructure including: a hypervisor management component providing data for defining a hypervisor profile of characteristics of the operation of one or more hypervisors in the infrastructure; a network management component providing data for defining a network communication profile of characteristics of network communication for the application; and a storage management component providing data for defining a data storage profile of characteristics of data storage for the infrastructure, the profiles collectively defining an application profile for the software application, the method comprising: training the classifier to generate a first classification using training data sets based on one or more application profiles, so as to classify an application profile as underperforming; training the classifier to generate a set of second classifications using training data sets based on each of: one or more application profiles; one or more hypervisor profiles; one or more network communication profiles; and one or more data storage profiles, so as to classify a profile for which optimization will provide improved application performance; training the classifier to generate a set of third classifications using training data sets based on each of: one or more application profiles; one or more hypervisor profiles; one or more network communication profiles; and one or more data storage profiles, so as to classify a profile for which additional infrastructure resource is required to provide improved application performance; implementing one or more of hypervisor optimization, network optimization and data storage optimization for the application in response to applying the first, second and third classifications to data sets based on the profiles of the application; and deploying one or more of additional hypervisor resource, additional network resource and additional data storage resource for the application in response to applying the first, second and third classifications to data sets based on the profiles of the application.

In some embodiments, each training data set corresponds to a training profile such that: a training data set for a hypervisor profile corresponds to a training profile of hypervisor characteristics; a training data set for a network communication profile corresponds to a training profile of network communication characteristics; a training data set for a data storage profile corresponds to a training profile of data storage characteristics; and a training data set for an application profile is defined based on the training profile, network communication profile and the storage profile.

In some embodiments a hypervisor profile, a network communication profile, and a data storage profile are different types of profile and wherein each training profile for each type of profile is generated from previous executions of the application and/or other software applications and the training steps include receiving indications of suitability for each training profile for optimization and additional infrastructure resource to improve the performance of the respective application.

In some embodiments, hypervisor optimization includes one or more of: adjusting a prioritization of host system resource for one or more virtual machines, clusters and/or hypervisors in the virtualized computing infrastructure; removing one or more unused virtualized computing devices; adjusting a configuration of one or more virtualized processors including a virtualized processor type, a number or arrangement of virtualized sockets, cores and/or threads; configuring virtualized processor affinity for one or more application processes and/or threads; adjusting a caching configuration for one or more virtualized processors; adjusting an input/output (I/O) mode of operation for one or more virtual machines in the virtualized computing infrastructure; adjusting a memory configuration for one or more virtual machines including one or more of a memory segmentation, memory alignment and memory paging configuration; and adjusting a non-uniform memory access (NUMA) configuration for one or more virtual machines.

In some embodiments, deploying additional hypervisor resource includes one or more of: instantiating one or more additional virtual machines for the application; instantiating one or more additional virtual processors for the application; allocating one or more additional physical processors for the virtualized computing infrastructure; allocating one or more additional physical computing machines to the virtualized computing infrastructure; instantiating additional memory in the virtualized computing infrastructure for the application; and allocating additional physical memory to the virtualized computing infrastructure.

In some embodiments, network optimization includes one or more of: wide area network (WAN) optimization including one or more of traffic shaping, data deduplication, compression, caching, non-essential traffic identification and reduction, usage rule enforcement, and protocol spoofing; implementing or supplementing network caching in the virtualized computing infrastructure; configuring a maximum transmission unit (MTU) in one or more physical and/or virtualized computing systems for the application and/or virtualized computing infrastructure; adjusting a configuration of one or more virtualized network interfaces such as virtual network interface cards (NICs) and their association with physical NICs; adjusting a prioritization of allocation of physical NIC resource to one or more virtual NICs; implementing compression, deduplication, redundant data removal and/or rule enforcement for data communicated via one or more virtualized NICs; and implementing an address resolution protocol (ARP) filter (arp_filter) to mitigate ARP flux as responses by multiple network interfaces to ARP requests.

In some embodiments, deploying additional network resource includes one or more of: increasing available network bandwidth for one or more virtual machines in the virtualized computing infrastructure; increasing available network transmission speed for one or more virtual machines in the virtualized computing infrastructure; allocating one or more additional physical network connections for the virtualized computing infrastructure; instantiating one or more additional virtualized NICs; and allocating one or more additional physical NICs.

In some embodiments, data storage optimization includes one or more of: adjusting a prioritization of host system storage resource for one or more virtual machines, clusters and/or hypervisors in the virtualized computing infrastructure; adjusting a caching configuration for one or more virtualized storage devices in the virtualized computing infrastructure; and adjusting an input/output (I/O) mode of operation for one or more virtualized storage devices in the virtualized computing infrastructure.

In some embodiments, deploying additional data storage resource includes one or more of: adjusting a capacity of one or more virtualized data storage devices in the virtualized computing infrastructure; instantiating one or more additional virtual data storage devices for the application; instantiating one or more additional virtual processors for virtual data storage devices in the virtualized computing infrastructure; allocating one or more additional physical data storage devices for the virtualized computing infrastructure; and allocating additional memory for caching of one or more virtual or physical storage devices of the virtualized computing infrastructure.

In some embodiments, the machine learning algorithm uses a k-nearest neighbors (k-NN) algorithm.

The present disclosure accordingly provides, in a third aspect, a computer system including a processor and memory storing computer program code for performing the method set out above.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
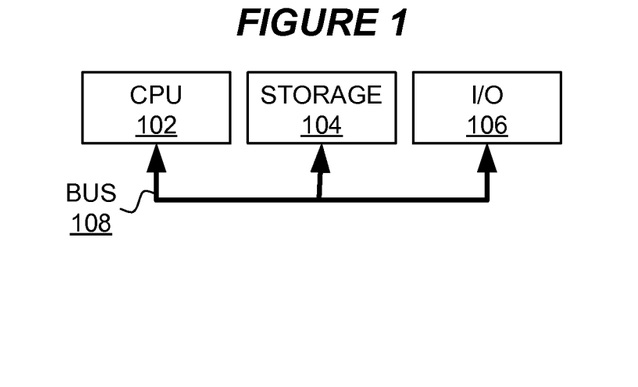
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
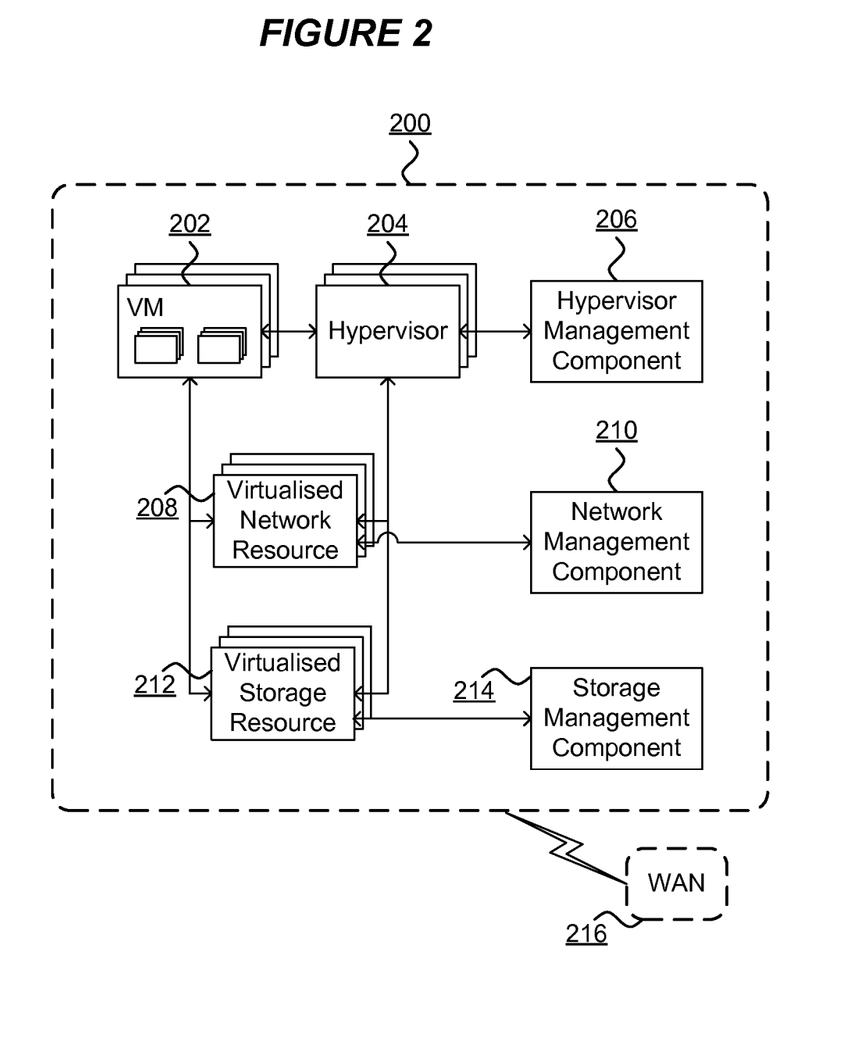
FIG. 2 is a component diagram of an arrangement of virtualized computing infrastructure with which an application executes in accordance with embodiments of the present disclosure.

FIG. 2 is a component diagram of an arrangement of virtualized computing infrastructure 200 with which an application executes in accordance with embodiments of the present disclosure. The virtualized computing infrastructure 200 is a network connected computing environment suitable for the execution of software applications. Computing resources are provided at least partly virtually such that operating system software, computing platform software and applications software execute with the virtualized infrastructure environment such as on top of, within or in association with the virtualized infrastructure. An exemplary arrangement of a virtualized infrastructure is illustrated in FIG. 2 and those skilled in the art will appreciate that different arrangements, configurations, constituents and components can be provided in such environments.

The virtualized infrastructure 200 of FIG. 2 can be implemented using one or more physical computing systems comprised of hardware, software, firmware and combination components arranged to provide the elements illustrated in FIG. 1. Further, network connectivity is provided by physical devices to communicate with, for example, a wide area network (WAN) 216 or other communications means and networks as will be apparent to those skilled in the art. Such communication means and networks provide for communication between applications and within applications, such as client/server applications and the like. The physical devices and components are used to provide the virtualized computing infrastructure 200 with which applications will execute. An example of virtualized infrastructure 200 is a cloud computing environment provided by a cloud service provider.

The exemplary infrastructure 200 includes one or more hypervisors 204 as virtual machine (VM) managers known in the art. Hypervisors 204 generate, instantiate, provision and/or deploy one or more VMs 202 as virtualized computer systems and/or other virtualized resources. Each VM 202 can include virtualized CPU, storage and I/O facilities according to the computer system arrangement of FIG. 1. Further, VMs can include virtualized network resources such as virtualized network interface cards (NICs), virtualized network protocols and the like. Additionally or alternatively, virtualized network resources can exist in conjunction with one or more of the VMs as are illustrated in FIG. 2. For example, one or more virtualized network resources 208 can be provided and/or one or more virtualized storage resources 212.

It will be apparent to those skilled in the art that the resources provided in the virtualized computing infrastructure 200 can be disparate in architecture, structure, standard and form. For example, multiple VMs can be deployed having different computing architectures and operating with different operating environments including different operating systems, middleware platforms and the like. Similarly, virtualized network resources can include network interfaces, routers, switches, channels and the like of potentially differing architectures, applying potentially different network or communications standards and/or operating with or supporting different communications protocols. Additionally, virtualized storage resources can include volatile and/or non-volatile storage including conventional memory, disk, tape, redundant arrays of storage devices, network attached storage, flash memory, and other storage resources as will be apparent to those skilled in the art. The virtualization of resources can be provided by any, all or any combination of: a hardware abstraction mechanism; emulation of hardware, software, firmware or combination systems, devices, resources and/or components; hardware assisted virtualization in which a host hardware platform at least partly facilitates the provision, instantiation, deployment and/or management of virtualized resources such as VMs as guest environments; mapping of virtualized resources to all or part of physical resources of a host physical infrastructure; and other techniques as will be apparent to those skilled in the art.

The virtualized computing infrastructure 200 of FIG. 2 further includes management components 206, 210, 214 for any or all of managing, configuring, deploying, monitoring, accessing and/or observing virtualized resources. These management components provide, permit, obtain, generate or store data pertaining to any or all of a configuration, performance, arrangement, utilization, availability, reliability, serviceability, accessibility, suitability or other characteristics of virtualized resources in the infrastructure 200. Such data thus constitutes a profile of at least an aspect of the virtualized computing infrastructure 200. A profile is a data structure, record, metadata and/or other suitable representation of characteristics of the virtualized computing infrastructure 200 and/or an application executing therewith. While the management components 206, 210, 214 are illustrated and described as discrete, separate and whole components it will be appreciated by those skilled in the art that the functions and facilities of the management components 206, 210, 214 may be provided at least partly by a combination of services, functions and/or facilities of other components of the infrastructure 200 or facilities external to the infrastructure 200. For example, features of the management components 206, 210, 214 may be provided by one or more of: the hypervisors 204; VMs 202; virtualized resources instantiated and/or deployed with, by or for one or more VMs 202; the virtualized network resources 208; the virtualized storage resources 212; and/or other components which may be external to the infrastructure 200.

The hypervisor management component 206 is a hardware, software, firmware or combination component configured to provide data relating to the hypervisors 204 and/or the VMs 202 constituting a hypervisor profile of the virtualized computing infrastructure 200. For example, the hypervisor management component 206 can provide a hypervisor profile based on: VM configuration information; platform information for platforms hosted by one or more VMs; virtualized and/or physical CPU resource, capacity, configuration, architecture and utilization information; virtualized and/or physical memory resource, capacity, configuration, architecture and utilization information; input/output (I/O) information including a volume, frequency, nature and type of VM I/O operations such as disk I/O, interface I/O, network I/O, and the like; operating performance information such as processing performance, memory usage, swap space usage and the like; hypervisor configuration information including hypervisor parameters and the like; a number of hypervisors; a number of VMs; and other hypervisor management, configuration and performance information as will be apparent to those skilled in the art.

The network management component 210 is a hardware, software, firmware or combination component configured to provide data relating to the virtualized network resources 208 instantiated, deployed, provisioned and/or provided for the virtualized computing infrastructure and constituting a network communication profile of the virtualized computing infrastructure 200. While the network management component 210 is illustrated in communication, interfaced and/or operable with the virtualized network resource 208 external to any VM 202 it will be appreciated that the network management component 210 can additionally or alternatively operate with virtualized network resources associated, included, instantiated or provisioned by, with or for any of the VMs 202. The network management component 210 can additionally or alternatively be deployed at least partly outside the virtualized infrastructure 200.

In one embodiment, the network management component 210 is directed to collect data from one or more physical or virtual network devices such as physical or virtual routers, edge routers, gateway routers, gateways, switches, ports, access points, terminals, connectors, network servers or the like. For example, the network management component 210 can be configured to receive, access or obtain network protocol traffic information such as NetFlow data including one or more of: ingress interface information; egress interface information; source addresses for network communication such as source IP addresses; destination addresses for network communication such as destination IP addresses; an identification of a protocol such as an IP protocol; source port, ports or port range for user datagram protocol (UDP) or TCP protocols; destination port, ports or port range for UDP or TCP protocols; bandwidth information and/or a bandwidth range; flow volume information and/or a flow volume range; network management information such as simple network management protocol (SNMP) information; a class of service; data, message or packet loss information; a type code for control protocols such as internet control message protocol (ICMP); a type of service (ToS) for IP communication such as may be obtainable from an IP header; application information for communication; a session count; and other network traffic information as will be apparent to those skilled in the art.

Further, the network management component 210 can be directed to collect, inspect, retrieve and/or measure information based on one or more network connections themselves including local network connections and the WAN 216. For example, information can be retrieved from a network connection between one or more VMs 202 and the WAN 216 such as a connection between a client computer system, a server computer system or a cloud infrastructure and the WAN 216. Such a connection may be realized between, for example, an edge router of the WAN 216 and a gateway router or interface of a VM 202. Additionally, or alternatively, information can be retrieved from a network connection between one or more VMs 202 and a local gateway router, or between interfaces or edge routers of the WAN 216 itself or otherwise between network or computing elements communicably connected via the WAN 216 to constitute network information about the WAN 216. For example, a deep packet inspection (DPI) mechanism can be employed to obtain information such as one or more of, inter alia: data received by a scheduled database read; information about a format of data communicated via the WAN 216 such as data formats that can be recognized, inferred or deduced from network traffic; information about one or more applications, services, facilities, functions or software routines communicating via the WAN 216 such as data formats that can be recognized, inferred or deduced from network traffic or network protocols employed; application type information that can be inferred, recognized or deduced from the network traffic; application delay information; application jitter information; and other network traffic information as will be apparent to those skilled in the art.

Additionally or alternatively, the network management component 210 can be adapted to provide, generate, obtain, store or retrieve: network retransmission rates; network error or failure occurrences and/or rates; local area network (LAN) to LAN delay, jitter and/or loss rates; round trip information such as time; server response times; bandwidth per application protocol session; and other information as will be apparent to those skilled in the art.

The storage management component 214 is a hardware, software, firmware or combination component configured to provide data relating to virtualized storage resources 212 instantiated, deployed, provisioned and/or provided for the virtualized computing infrastructure 200 constituting a data storage profile of the virtualized computing infrastructure 200. While the storage management component 214 is illustrated in communication, interfaced and/or operable with the virtualized storage resources 212 external to any VM 202 it will be appreciated that the storage management component 214 can additionally or alternatively operate with virtualized storage resources associated, included, instantiated or provisioned by, with or for any of the VMs 202. The storage management component 214 can additionally or alternatively be deployed at least partly outside the virtualized infrastructure 200. For example, the storage management component 214 can provide: storage type, class, configuration and/or arrangement information; storage volume, utilization, fragmentation and/or availability information; storage processor utilization and/or performance information such as a virtualized storage processor for a virtualized storage resource 212; I/O utilization, throughput, frequency, period and/or performance information; data storage or retrieval delay, queue and/or response time information; total IO throughput information; total write throughput information; total read throughput information; and other information in relation to the configuration, implementation, deployment, provisioning, operation and use of virtualized storage resource 212 as will be apparent to those skilled in the art.

In addition to the hypervisor profile, network communication profile and data storage profile described above for a virtualized computing infrastructure 200, a further profile can be generated as a combination, aggregation or selection of at least part of the data representing infrastructure characteristics from all of these profiles. Such a profile based on all of the hypervisor, network communication and data storage profiles is known as an application profile as it corresponds to all three aspects of the virtualized infrastructure 200 for executing an application. Notably, all profiles are specific to a particular virtualized infrastructure 200 in use for one or more deployed, instantiated and/or otherwise executing applications operating with the infrastructure 200.

Figure 3:
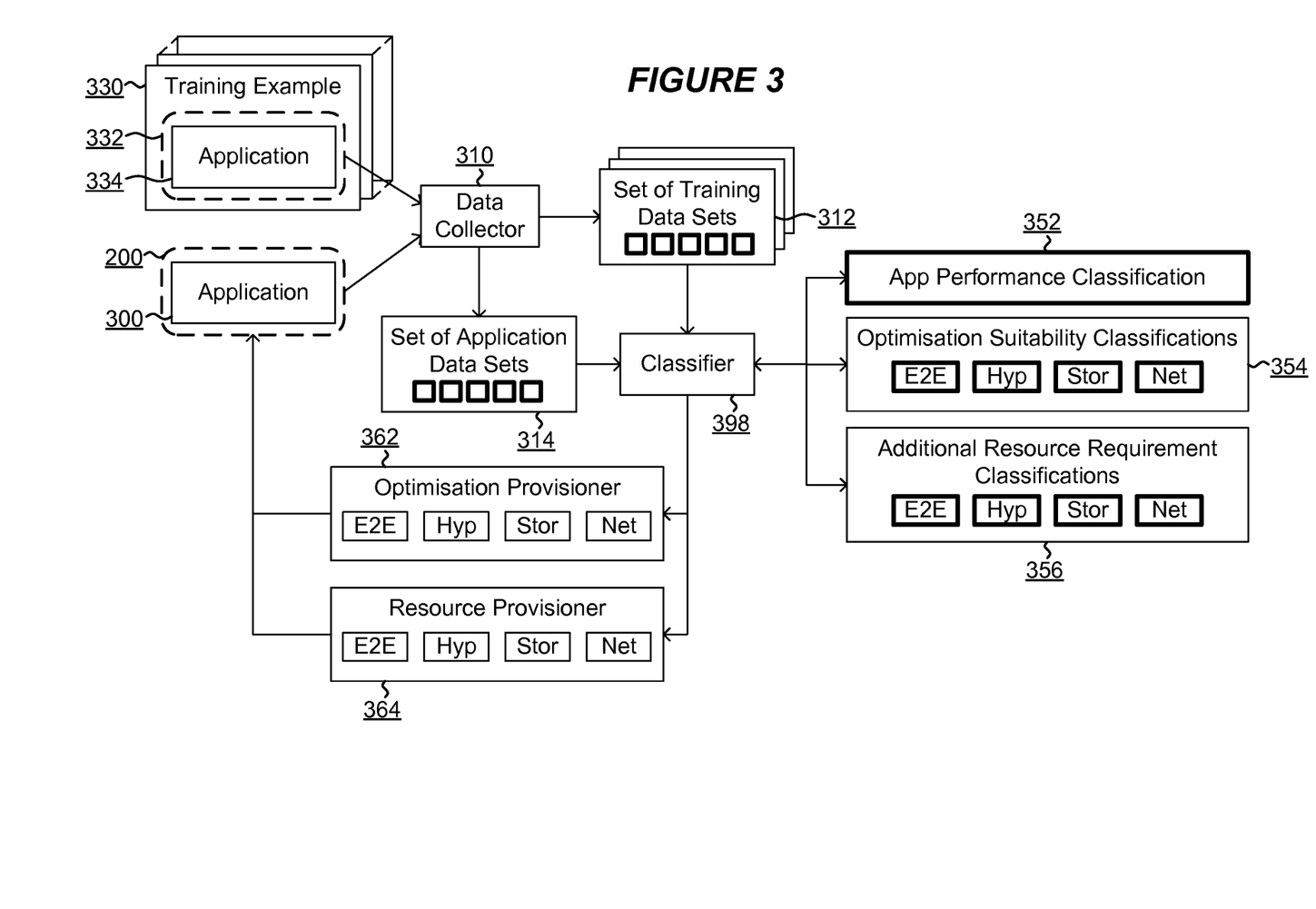
FIG. 3 is a component diagram of an arrangement for improving performance of a software application executing with a virtualized computing infrastructure in accordance with embodiments of the present disclosure.

FIG. 3 is a component diagram of an arrangement for improving performance of a software application 300 executing with a virtualized computing infrastructure 200 in accordance with embodiments of the present disclosure. A classifier 398 is provided as a hardware, software, firmware or combination component adapted to provide a plurality of classifications 352, 354, 356 of data items using a machine learning algorithm. Each of the classifications 352, 354, 356 is constituted based on training examples such as vectors in a multidimensional feature space and each training example has associated a classification indication. Thus, during training, examples are stored or indicated in the feature space of a classification in association with an indication of their classification. A feature space is a vector space in which vectors associated with classifiable entities (such as hypervisor, network communication or data storage characteristics in accordance with embodiments of the present invention) can be represented, mapped or stored as is described in "Feature Selection for Knowledge Discovery and Data Mining" (Liu, H., Motoda, H., 1998, Kluwer Academic Publishers, Norwell, Mass., USA). In a preferred embodiment, a k-nearest neighbor (k-NN) algorithm is employed by the classifier 398 to provide the classifications. The k-NN algorithm is described in the paper "An Introduction to Kernel and Nearest-Neighbor Nonparametric Regression" (Altman, The American Statistician, Vol. 46, No. 3., Aug. 1992, pp. 175-185).

In accordance with embodiments of the present disclosure the classifier 398 generates each of the classifications 352, 354, 356 based on a plurality of sets of training data sets 312. Each training data set 312 is a vector such as a multi-dimensional vector derived from data relating to a training example 330. The data from each of a plurality of training examples 330 is obtained via one or more data collectors 310 as hardware, software, firmware or combination components interfaced with, in communication with or accessing data for either or both an application 334 and/or a virtualized infrastructure 332 for a training set 330. The data collector 310 can access, retrieve, measure or determine data via the management components 206, 210, 214 of the virtualized infrastructure 332 for a training example 330.

Each training example 330 includes an application 334 executing with a virtualized computing infrastructure 332 such as an infrastructure as illustrated in, and described with respect to, FIG. 2. Each set of training data sets 312 is based on one or more of the profiles generated based on data obtained, provided, stored or otherwise made available by or via the management components 206, 210, 214. In particular, for an application 334 of a training example 330 executing with a virtualized computing infrastructure 332 the following set of training data sets will be provided: a training data set based on a hypervisor profile for the training example 330; a training data set based on a network communication profile for the training example 330; a training data set based on a data storage profile for the training example 330; and a training data set based on an application profile for the training example 330. Associated with each training example 330 is a set of indicators, each of which is described below.

For each training example 330 an indicator is provided for identifying whether the virtualized infrastructure 332 and/or the application 334 executing therewith for a training example 330 is underperforming, such as underperformance based on a predetermined threshold level of performance including one or more measures of performance characteristics of the application 334 such as, inter alia, any or all of: a speed of operation of the application 334; data storage performance of the application 334 including any or all of storage or retrieval volume, utilization, capacity, frequency, speed, integrity, deduplication, configuration and the like; network performance of the application 334 including any or all of network throughput, bandwidth, delay, retransmissions, errors, integrity, security, round trip time and the like; the performance of VMs involved in the operation of the application 334 including processing speed, responsiveness, throughput, memory utilization, memory speed, memory capacity, error and/or exception generation, failure rate, and the like; and other measures of performance of the application 334 as will be apparent to those skilled in the art. The indication of underperformance associated with a training example 330 can be determined empirically based on the deployment and/or execution of the application 334 for the training example 330 and the monitoring, observation, measurement or retrieval of performance information.

For each training example 330 a suitability indicator is provided for indicating whether one or more hypervisors 204 in the virtualized computing infrastructure 332 for the application 334 are suitable for optimization to achieve a performance improvement. The indication of suitability for hypervisor optimization for a training example 330 can be determined empirically based on, inter alia: the deployment and/or execution of the application 334 for the training example 330; the implementation of one or more hypervisor optimization measures for the computing infrastructure 332; and the monitoring, observation, measurement or retrieval of performance information following implementation of the optimization measures. Such hypervisor optimization measures can include, inter alia: the removal of one or more unused virtualized computing devices such as VMs 202; adjusting a configuration of one or more virtualized processors for one or more VMs 202 including, for example, one or more of a virtualized processor type, a number or arrangement of virtualized sockets, cores and/or threads; configuring virtualized processor affinity for one or more application processes and/or threads in one or more VMs 202; adjusting a caching configuration for one or more virtualized processors in one or more VMs 202; adjusting an input/output (I/O) mode of operation for one or more VMs 202 in the virtualized computing infrastructure 332; adjusting a memory configuration for one or more VMs 202 including one or more of a memory segmentation, memory alignment and memory paging configuration; and/or adjusting a non-uniform memory access (NUMA) configuration for one or more VMs. Other techniques for hypervisor 204 and/or VM 202 optimization will be apparent to those skilled in the art. It will be appreciated that references herein to hypervisor optimization include optimization of one or more hypervisors 204 in a virtualized computing infrastructure 200, 332 and/or optimization of one or more VMs 202 deployed, provisioned, instantiated and/or executing in the infrastructure 200, 332.

For each training example 330 a suitability indicator is provided for indicating whether one or more virtualized network resources 208 in the virtualized computing infrastructure 332 for the application 334 are suitable for optimization to achieve a performance improvement. The indication of suitability for network optimization for a training example 330 can be determined empirically based on, inter alia: the deployment and/or execution of the application 334 for the training example 330; the implementation of one or more network optimization measures for the computing infrastructure 332; and the monitoring, observation, measurement or retrieval of performance information following implementation of the optimization measures. Such network optimization measures can include, inter alia: WAN optimization including one or more of traffic shaping, data deduplication, compression, caching, non-essential traffic identification and reduction, usage rule enforcement, and protocol spoofing; implementing or supplementing network caching in the virtualized computing infrastructure 332; configuring a maximum transmission unit (MTU) in one or more physical and/or virtualized computing systems such as VMs 202 for the application 334 and/or virtualized computing infrastructure 332; adjusting a configuration of one or more virtualized network interfaces such as virtual network interface cards (NICs) and/or their association with physical NICs; adjusting a prioritization of allocation of physical network and/or NIC resource to one or more virtual NICs; implementing compression, deduplication, redundant data removal and/or rule enforcement for data communicated via one or more virtualized NICs; and/or implementing an address resolution protocol (ARP) filter (arp_filter) to mitigate ARP flux as responses by multiple network interfaces to ARP requests.

For each training example 330 a suitability indicator is provided for indicating whether one or more virtualized storage resources 212 in the virtualized computing infrastructure 332 for the application 334 are suitable for optimization to achieve a performance improvement. The indication of suitability for storage optimization for a training example 330 can be determined empirically based on, inter alia: the deployment and/or execution of the application 334 for the training example 330; the implementation of one or more storage optimization measures for the computing infrastructure 332; and the monitoring, observation, measurement or retrieval of performance information following implementation of the optimization measures. Such storage optimization measures can include, inter alia: adjusting a prioritization of host or physical system storage resource for one or more VMs 202, clusters of VMs 202 and/or hypervisors 204 in the virtualized computing infrastructure 332; adjusting a caching configuration for one or more virtualized storage resources 212 such as virtualized storage devices in the virtualized computing infrastructure 332; and/or adjusting an input/output (I/O) mode of operation for one or more virtualized storage devices in the virtualized computing infrastructure 332.

For each training example 330 an indicator is provided to identify whether additional virtualized resource deployed, instantiated, implemented and/or provisioned by one or more hypervisors 204 is required to achieve a performance improvement for the application 334 executing with the virtualized computing infrastructure 332. The indication of a requirement for additional virtualized resource by hypervisors 204 for a training example 330 can be determined empirically based on, inter alia: instantiating one or more additional virtual machines for the application 334 for the training example 330; instantiating one or more additional virtual processors for the application 334 for the training example 330; allocating one or more additional physical processors to the virtualized computing infrastructure 332 for the training example; allocating one or more additional physical computing machines, systems, devices or the like to the virtualized computing infrastructure 332 for the training example 330; instantiating additional memory in the virtualized computing infrastructure 332 for the application 334 for the training example; and/or allocating additional physical memory to the virtualized computing infrastructure 332 for the training example.

For each training example 330 an indicator is provided to identify whether additional data storage resource is required to achieve a performance improvement for the application 334 executing with the virtualized computing infrastructure 332. The indication of a requirement for additional data storage resource for a training example 330 can be determined empirically based on, inter alia: adjusting a capacity of one or more virtualized data storage devices in the virtualized computing infrastructure 332 of the training example 330; instantiating one or more additional virtual data storage devices for the application 334 of the training example 330; instantiating one or more additional virtual processors for virtual data storage devices in the virtualized computing infrastructure 332 for the training example 330; allocating one or more additional physical data storage devices for the virtualized computing infrastructure 332 for the training example 330; and/or allocating additional memory for caching of one or more virtual or physical storage devices of the virtualized computing infrastructure 332 for the training example 330.

For each training example 330 an indicator is provided to identify whether additional network resource is required to achieve a performance improvement for the application 334 executing with the virtualized computing infrastructure 332. The indication of a requirement for additional network resource for a training example 330 can be determined empirically based on, inter alia: increasing available network bandwidth for one or more VMs 202 in the virtualized computing infrastructure 332 for the training example 330; increasing available network transmission speed for one or more VMs 202 in the virtualized computing infrastructure 332 for the training example 330; allocating one or more additional physical network connections for the virtualized computing infrastructure 332 for the training example 330; instantiating one or more additional virtualized NICs for one or more VMs 202 for the training example 330; and/or allocating one or more additional physical NICs for one or more VMs 202 and/or hypervisors 204 for the training example 330.

The classifier 398 generates an application performance classification 352 based on a plurality of sets of training data sets 312. Once generated, the application performance classification 352 is suitable for classifying an application 300 deployed for execution with a virtualized computing infrastructure 200 to determine whether the application 300 is classified as underperforming. The classification of the application 300 by the application performance classification 352 is achieved by classifying a data set for the application 314 based on an application profile for the application 314. Thus, in this way, the classifier 398 is able to determine, based on the application performance classification 352, whether the application 300 executing with the virtualized infrastructure 200 is underperforming.

The classifier 398 further generates a set of optimization suitability classifications 354 based on a plurality of sets of training data sets 312. Once generated, each of the optimization suitability classifications 354 is arranged to classify the application 300 deployed for execution with the virtualized computing infrastructure 200 to determine whether the application 300 is suitable for optimization to achieve improved performance. Each of the optimization suitability classifications 354 in the set is directed to a particular profile of application and/or virtualized infrastructure performance. A hypervisor ("Hyp") optimization suitability classification serves to classify the application 300 to determine whether hypervisor and/or VM optimization is suitable for achieving a performance improvement. A data storage ("Stor") optimization suitability classification serves to classify the application 300 to determine whether data storage optimization is suitable for achieving performance improvement. A network ("Net") optimization suitability classification serves to classify the application 300 to determine whether network optimization is suitable for achieving performance improvement. An end-to-end ("E2E") optimization suitability classification serves to classify the application 300 to determine whether optimization of all of: hypervisor and/or VM optimization; data storage optimization; and network optimization is suitable for achieving performance improvement. The classification of the application 300 by each of the optimization suitability classifications 354 is achieved by classifying data sets for the application 314 based on one or more of: a hypervisor profile; a network communication profile; a storage profile; and an application profile for the application 314. Thus, in this way, the classifier 398 is able to determine, based on the optimization suitability classifications 354, whether, and if so, which, optimization measures can be implemented to achieve performance improvement for the application 300 executing with the virtualized infrastructure 200.

The classifier 398 further generates a set of additional resource requirement classifications 356 based on a plurality of sets of training data sets 312. Once generated, each of the additional resource requirement classifications 356 is arranged to classify the application 300 deployed for execution with the virtualized computing infrastructure 200 to determine whether the application 300 requires additional resource to achieve improved performance. Each of the additional resource requirement classifications 356 in the set is directed to a particular profile of application and/or virtualized infrastructure performance. A hypervisor ("Hyp") additional resource requirement classification serves to classify the application 300 to determine whether additional hypervisor and/or VM resources are required to achieve a performance improvement. A data storage ("Stor") additional resource requirement classification serves to classify the application 300 to determine whether additional data storage resource is required for achieving performance improvement. A network ("Net") additional resource requirement classification serves to classify the application 300 to determine whether additional network optimization is required for achieving performance improvement. An end-to-end ("E2E") additional resource requirement classification serves to classify the application 300 to determine whether additional resource across all of: hypervisor and/or VM resource; data storage resource; and network resource is required for achieving performance improvement. The classification of the application 300 by each of the additional resource requirement classifications 356 is achieved by classifying data sets for the application 314 based on one or more of: a hypervisor profile; a network communication profile; a storage profile; and an application profile for the application 314. Thus, in this way, the classifier 398 is able to determine, based on the additional resource requirement classifications 356, whether, and if so, which, additional resources are required to achieve performance improvement for the application 300 executing with the virtualized infrastructure 200.

Thus, in use, the classifier 398 is initially employed to generate the classifications 352, 354, 356. Subsequently, the classifications 352, 354, 356 are suitable, with the classifier 398, to identify an application 300 and/or virtualized computing infrastructure 200 that is underperforming (based on the application performance classification 352). For such an underperforming application 300, the classifier 398 identifies where optimization is suitable for achieving performance improvement (based on one or more of the optimization suitability classifications 354), and/or where additional resource is required to achieve performance improvement (based on one or more of additional resource requirement classifications 356). The classifier 398 receives a set of application data sets 314 for the application 300 where these data sets are provided by the data collector 310 accessing management components 206, 210, 214 of a virtualized infrastructure 200 for the application 300 in the same was as described above in respect of training examples 330. A difference between the data sets in the set of application data sets 314 and the data sets in the sets of training data sets 312 is that the application data sets do not have associated indicators such as underperformance indicators, optimization suitability indicators or additional resource requirement indicators. Rather it is the classification of the application data sets by the classifier 398 based on the classifications 352, 354, 356 resulting from training that determines whether the application is underperforming, suitable for optimization and/or requires additional resource.

Responsive to the classifier 398 having classified a set of application data sets 314 for an underperforming application 300, an optimization provisioner 362 is a hardware, software, firmware or combination component for implementing one or more of hypervisor optimization ("Hyp"), data storage optimization ("Stor") and/or network optimization ("Net"). For example, end-to-end optimization ("E2E") will involve some optimization of each type. Whether, and if so, which, resource optimization(s) are undertaken by the optimization provisioner 362 is determined by the classification of the application 300 by the classifier 398 in the optimization suitability classifications 354. Similarly responsive to the classifier 398 having classified a set of application data sets 314 for an underperforming application 300, a resource provisioner 364 is a hardware, software, firmware or combination component for deploying one or more of additional hypervisor and/or VM resource ("Hyp"), additional data storage resource ("Stor") and/or additional network resource ("Net"). For example, deploying additional resource end-to-end ("E2E") will involve deploying additional resource of each type. Whether, and if so, which, additional resource(s) are deployed by the resource provisioner 364 is determined by the classification of the application 300 by the classifier 398 in the additional resource requirement classifications 356.

The classification of the application 300 by the classifier 398 for any of the classifications 352, 354, 356 is determined based on the classification of application data sets in the set of application data sets 314. For example, using a k-NN algorithm, a Euclidean distance between a feature vector for an application data set an k nearest feature vectors in a classification (generated based on training data sets 312) can be used to determine whether the application 300 is: underperforming; suitable for optimization; and/or requires additional resource. This determination is made based on the indicators associated with the k nearest neighbor feature vectors in each classification accordingly. In one embodiment, to classify an application data set, a predetermined number, k, of nearest neighbor vectors in the feature space are identified for the application data set. One approach to identifying an appropriate classification for the application data set (in one of the classifications 352, 354, 356) is to provide a vote to each of the k nearest neighbors—where k is odd—and to classify the application data set on the basis of the most votes such that each of the k nearest neighbors votes in accordance with its own classification.

Thus, in this way an underperforming application 300 identified by the classifier 398 based on the application performance classification 352 can be adapted, adjusted, supplemented, reconfigured or the like to achieve performance improvement by the implementation of optimization measures and/or the deployment of additional resource as indicated by the classification of the application data sets 313 by the classifier based on the optimization suitability classifications 354 and the additional resource requirement classifications 356. Accordingly the detection of underperformance and the improvement of performance are automatic without a requirement for user or operator intervention.

Figure 4:
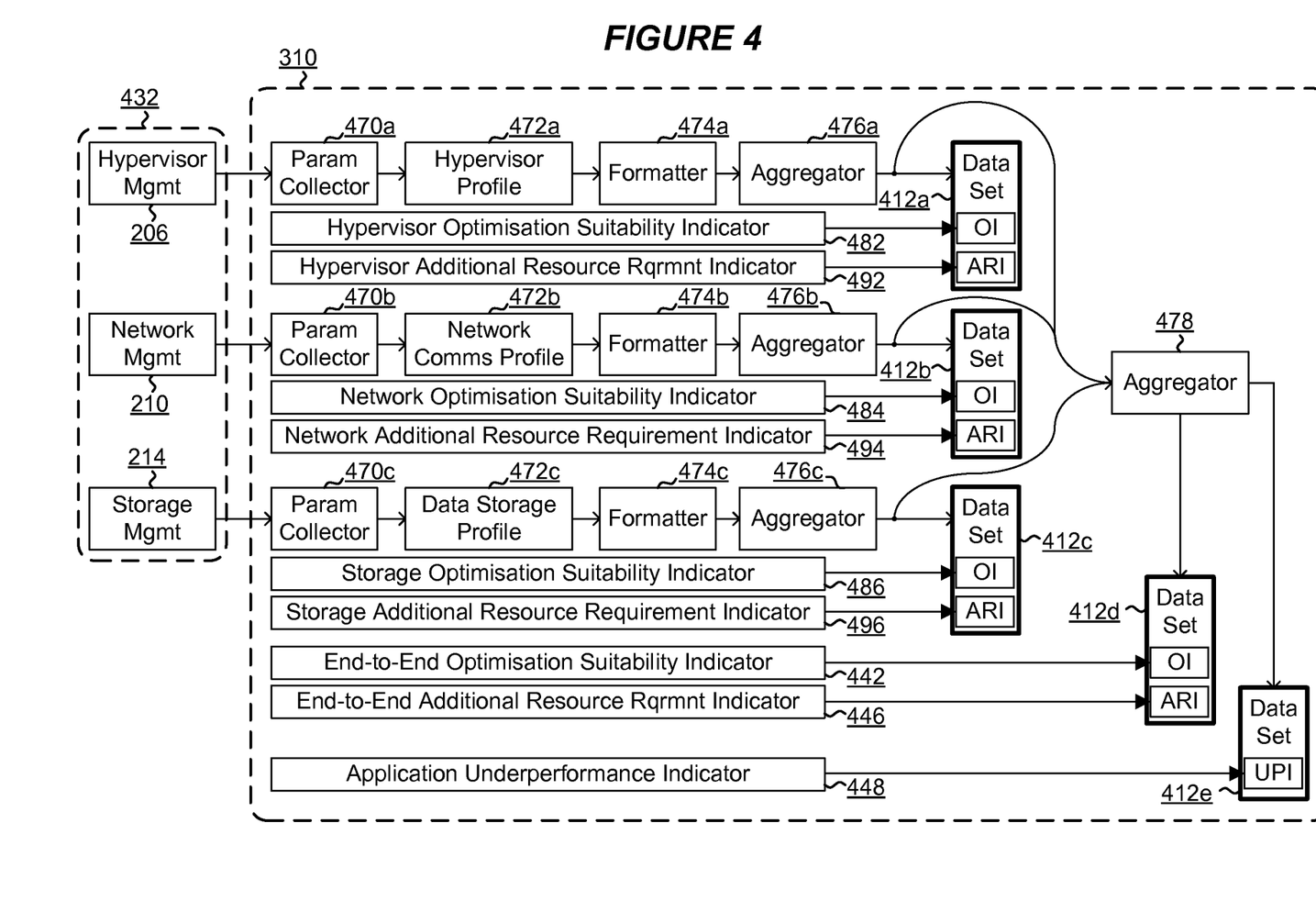
FIG. 4 illustrates an arrangement for the data collector of FIG. 3 for generating a set of training data sets in accordance with embodiments of the present disclosure.

FIG. 4 illustrates an arrangement for the data collector 310 of FIG. 3 for generating a set of training data sets 312 in accordance with embodiments of the present disclosure. The arrangement of the data collector 310 of FIG. 4 is exemplary and alternative data collector arrangements or configurations could equally be used. The data collector 310 includes a plurality of parameter collectors 470 as software, hardware, firmware or combination components for obtaining, receiving, determining and/or measuring data via management components 206, 210, 214. The data accessed by each parameter collector 470 includes some or all of the data accessible via each of the management components 206, 210, 214 described above with respect to FIG. 2. In addition to data accessed by the parameter collectors 470, indicators are provided to the data collector 310. These indicators include: optimization suitability indicators 482, 484, 486, 442; additional resource suitability indicators 492, 494, 496, 336; and an underperformance indicator 448. As previously described these indicators are determined empirically such as based on an analysis of an application 334 and a virtualized infrastructure 332 for a training example 330 in execution. Such empirical determinations can be made by an operator for each training example. In a preferred embodiment, the indicators for at least some portion of training examples are based on historical information for applications executing with virtualized infrastructures for which underperformance was observed and/or determined and remediation measures were implemented including either or both of optimization measures and/or the deployment of additional resource(s).

A parameter collector 470a accessing data via a hypervisor management component 206 thus generates a hypervisor profile 472a on which basis a data set 412a is generated. The data set 412a includes: an indicator 482 of suitability for hypervisor and/or VM optimization to achieve performance improvement; and an indicator 492 of a requirement for additional hypervisor/VM resource to achieve performance improvement. Further, a parameter collector 470b accessing data via a network management component 210 generates a network communications profile 472b on which basis a data set 412b is generated. The data set 412b includes: an indicator 484 of suitability for network optimization to achieve performance improvement; and an indicator 494 of a requirement for additional network resource to achieve performance improvement. Further, a parameter collector 470c accessing data via a storage management component 214 generates a storage communications profile 472c on which basis a data set 412c is generated. The data set 412c includes: an indicator 484 of suitability for storage optimization to achieve performance improvement; and an indicator 494 of a requirement for additional storage resource to achieve performance improvement.

The data collector 310 further optionally includes one or more data cleaners, formatters and/or transformers 474 for each profile 472 as one or more hardware, software, firmware or combination components for affecting the format and/or content of the data collected by the parameter collectors 470 such that the data is suitable for aggregation by an aggregator 476 for the generation of a vector suitable for classification by the classifier 398. In one embodiment, each data cleaner, formatter and/or transformer 474 is operable on the basis of rules that define how data is to be prepared. Thus, the parameter collectors 470 and clean/format/transformers 474 each generate potentially multiple items of data that are subsequently aggregated by aggregators 476 to generate aggregate records of data. Each aggregator 476 is a hardware, software, firmware or combination component configured to receive multiple data items and generate an aggregate record. The format of the aggregate record and/or the mechanism for aggregation can be rule-based. Each aggregate record can constitute a particular time period such that data is included for a predetermined number of minutes, hours, days, weeks and the like.

In addition to data sets 412a, 412b and 412c generated based on hypervisor data, network data and storage data respectively, a further aggregator 478 is provided for aggregating data based on parameters accessed for each of the management components 206, 210, 214 to generate a pair of data sets 412d, 412e each based on all of the hypervisor profile 472a, network communications profile 472b and data storage profile 472c. While the aggregation of aggregator 478 is illustrated in FIG. 4 as being based on the output of aggregators 476, it will be appreciated by those skilled in the art that the aggregator 478 could alternatively aggregate data provided directly by the formatters 474 or based on the profiles 472 themselves. In a preferred embodiment (not illustrated) an application profile is generated as an intermediate profile based on the data accessed by all of the parameter collectors 470. In the preferred embodiment, the application profile is itself optionally formatted by a formatter and aggregated by the aggregator 478 on which basis the data sets 412d and 412e are generated.

Data set 412d further includes an end-to-end optimization suitability indicator 442 and an end-to-end additional resource requirement indicator 446 each of which is generated empirically based on one or more determinations that optimization of all of the hypervisor/VM, network and storage is suitable for obtaining a performance improvement and/or additional resource for all of the hypervisor/VM, network and storage is required to achieve a performance improvement.

Data set 412e further includes an application underperformance indicator 448 which is generated empirically based on a determination that an application 334 executing with a virtualized infrastructure 332 for a training example 330 is underperforming.

It will be appreciated by those skilled in the art that the operation of the data collector 310 for generating the set of application data sets 314 for an application 300 in execution is substantially similar to the operation of the data collector 310 for generating a set of training data sets 312 except that an application data set does not have associated: optimization suitability indicators 482, 484, 486, 442; additional resource indicators 492, 494, 496, 446; or an underperformance indicator 448.

In some embodiments, the parameter collectors 432 or the data collector 312 will include time information associated with collected data such that a time, period or frequency of collection can be determined.

Figure 5:
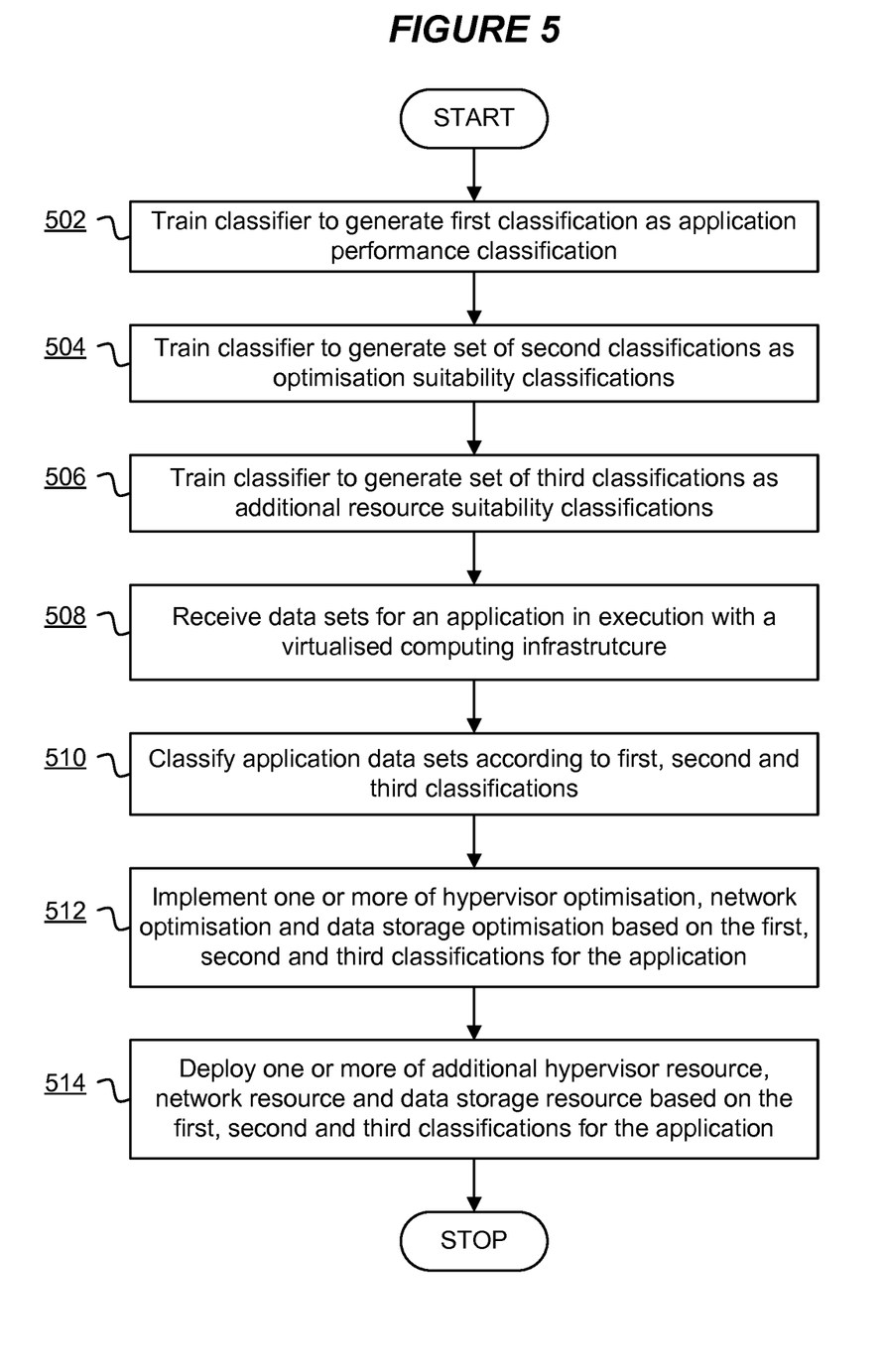
FIG. 5 is a flowchart of a method of improving performance of a software application executing with a virtualized computing infrastructure in accordance with embodiments of the present disclosure.

FIG. 5 is a flowchart of a method of improving performance of a software application 300 executing with a virtualized computing infrastructure 200 in accordance with embodiments of the present disclosure. Initially, at 502, the classifier 398 is trained to generate a first classification as the application performance classification 352 using training data sets based on one or more application profiles. At 504, the classifier 398 is trained to generate a set of second classifications as the optimization suitability classifications 354 using training data sets based on each of: one or more application profiles; one or more hypervisor profiles; one or more network communication profiles; and one or more data storage profiles. At 506, the classifier 398 is trained to generate a set of third classifications as the additional resource requirement classifications 356 using training data sets based on each of: one or more application profiles; one or more hypervisor profiles; one or more network communication profiles; and one or more data storage profiles. At 508, the method receives a set of application data sets 314 for an application 300 in execution with a virtualized computing infrastructure 200. At 510, the application data sets in the set of application data sets 314 are classified by the classifier 398 according to each of the first classification (the application performance classification 352), each classification in the set of second classifications (the optimization suitability classifications 354), and each classification in the set of third classifications (the additional resource requirement classifications 356). At 512, the optimization provisioner 362 implements one or more of hypervisor optimization, network optimization and data storage optimization for the application 300 and/or the virtualized infrastructure 200 based on the first, second and third classifications for the application 300. At 514, the resource provisioner 364 deploys one or more of additional hypervisor/VM resource, additional network resource and additional data storage resource for the application 300 and/or the virtualized infrastructure 200 based on the first, second and third classifications for the application 300.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation.

The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of improving performance of a software application executing with a virtualized computing infrastructure wherein the application has associated a hypervisor profile of characteristics of a hypervisor in the infrastructure, a network communication profile of characteristics of network communication for the application, a data storage profile of characteristics of data storage for the infrastructure, and an application profile defined collectively by the other profiles, the method comprising:
    training a classifier to generate a first classification using training data sets based on application profiles so as to classify an application profile as underperforming;
    training the classifier to generate a set of second classifications and a set of third classifications using training data sets based at least one of:
        an application profile, a hypervisor profile, a network communication profile, or a data storage profile,
        wherein the classifications in the second set classify a profile for which optimization will provide improved application performance, and
        wherein the classifications in the third set classify a profile for which additional infrastructure resource is required to provide improved application performance; and
    in response to applying the first classifications, the second classifications and the third classifications to data sets based on the application profile, implementing one or more of the following for the application:
        optimization of a hypervisor, network or data storage, or
        deploying an additional resource for the hypervisor, network or data storage.

2. The method of claim 1, wherein hypervisor optimization includes one or more of:
- adjusting a prioritization of a host system resource for one or more virtual machines, clusters or hypervisors in the virtualized computing infrastructure;
- removing one or more unused virtualized computing devices;
- adjusting a configuration of one or more virtualized processors including a virtualized processor type, or a number or arrangement of virtualized sockets, cores or threads;
- configuring a virtualized processor affinity for one or more application processes and/or or threads;
- adjusting a caching configuration for one or more virtualized processors;
- adjusting an input/output (I/O) mode of operation for one or more virtual machines in the virtualized computing infrastructure;
- adjusting a memory configuration for one or more virtual machines including one or more of a memory segmentation, a memory alignment or a memory paging configuration; or
- adjusting a non-uniform memory access (NUMA) configuration for one or more virtual machines.

3. The method of claim 1, wherein deploying an additional hypervisor resource includes one or more of:
- instantiating one or more additional virtual machines for the application;
- instantiating one or more additional virtual processors for the application;
- allocating one or more additional physical processors for the virtualized computing infrastructure;
- allocating one or more additional physical computing machines to the virtualized computing infrastructure;
- instantiating additional memory in the virtualized computing infrastructure for the application; and
- allocating additional physical memory to the virtualized computing infrastructure.

4. The method of claim 1, wherein network optimization includes one or more of:
- wide area network (WAN) optimization including one or more of traffic shaping, data deduplication, compression, caching, non-essential traffic identification and reduction, usage rule enforcement, or protocol spoofing;
- implementing or supplementing network caching in the virtualized computing infrastructure;
- configuring a maximum transmission unit (MTU) in one or more physical or virtualized computing systems for the application or virtualized computing infrastructure;
- adjusting a configuration of one or more virtualized network interfaces;
- adjusting a prioritization of allocation of a physical network interface card (NIC) resource to one or more virtual NICs;
- implementing one or more of compression, deduplication, redundant data removal or rule enforcement for data communicated via one or more virtualized NICs; and
- implementing an address resolution protocol (ARP) filter (arp_filter) to mitigate ARP flux as responses by multiple network interfaces to ARP requests.

5. The method of claim 1, wherein deploying additional network resource includes one or more of:
- increasing available network bandwidth for one or more virtual machines in the virtualized computing infrastructure;
- increasing available network transmission speed for one or more virtual machines in the virtualized computing infrastructure;
- allocating one or more additional physical network connections for the virtualized computing infrastructure;
- instantiating one or more additional virtualized network interface cards (NICs); or
- allocating one or more additional physical NICs.

6. The method of claim 1, wherein data storage optimization includes one or more of:
- adjusting a prioritization of host system storage resource for one or more virtual machines, clusters or hypervisors in the virtualized computing infrastructure;
- adjusting a caching configuration for one or more virtualized storage devices in the virtualized computing infrastructure; or
- adjusting an input/output (I/O) mode of operation for one or more virtualized storage devices in the virtualized computing infrastructure.

7. The method of claim 1, wherein deploying additional data storage resource includes one or more of:
- adjusting a capacity of one or more virtualized data storage devices in the virtualized computing infrastructure;
- instantiating one or more additional virtual data storage devices for the application;
- instantiating one or more additional virtual processors for virtual data storage devices in the virtualized computing infrastructure;
- allocating one or more additional physical data storage devices for the virtualized computing infrastructure; or
- allocating additional memory for caching of one or more virtual storage devices or physical storage devices of the virtualized computing infrastructure.

8. The method of claim 1, wherein the machine learning algorithm uses a k-nearest neighbors (k-NN) algorithm.

9. A method of improving performance of a software application executing with a virtualized computing infrastructure using a classifier including a machine learning algorithm to classify data sets corresponding to profiles of characteristics of the application and the virtualized computing infrastructure, the virtualized computing infrastructure including a hypervisor management component providing data for defining a hypervisor profile of characteristics of the operation of one or more hypervisors in the infrastructure, a network management component providing data for defining a network communication profile of characteristics of network communication for the application, and a storage management component providing data for defining a data storage profile of characteristics of data storage for the infrastructure, the profiles collectively defining an application profile for the software application, the method comprising:
- training the classifier to generate a first classification using training data sets based on one or more application profiles, so as to classify an application profile as underperforming;
- training the classifier to generate a set of second classifications using training data sets based on each of:
  - one or more application profiles, one or more hypervisor profiles; one or more network communication profiles, and one or more data storage profiles,
  - so as to classify a profile for which optimization will provide improved application performance;
- training the classifier to generate a set of third classifications using training data sets based on each of:

one or more application profiles, one or more hypervisor profiles; one or more network communication profiles, and one or more data storage profiles,
so as to classify a profile for which an additional infrastructure resource is required to provide improved application performance;
implementing one or more of hypervisor optimization, network optimization or data storage optimization for the application in response to applying the first classifications, the second classifications and the third classifications to data sets based on the one or more application profiles; and
deploying one or more of an additional hypervisor resource, an additional network resource or an additional data storage resource for the application in response to applying the first classifications, the second classifications and the third classifications to data sets based on the one or more application profiles.

10. The method of claim 9, wherein each training data set corresponds to a training profile such that:
a training data set for a hypervisor profile corresponds to a training profile of hypervisor characteristics;
a training data set for a network communication profile corresponds to a training profile of network communication characteristics;
a training data set for a data storage profile corresponds to a training profile of data storage characteristics; and
a training data set for an application profile is defined based on the training profile, the network communication profile and the storage profile.

11. The method of claim 10, wherein the hypervisor profile, the network communication profile, and the data storage profile are different types of profiles, and wherein each training profile for each type of profile is generated from one or both of previous executions of the application or other software applications, and the training includes receiving indications of suitability for each training profile for optimization and an additional infrastructure resource to improve the performance of the respective application.

12. A computer system comprising:
a processor and memory for improving performance of a software application executing with a virtualized computing infrastructure wherein the application has associated a hypervisor profile of characteristics of a hypervisor in the infrastructure, a network communication profile of characteristics of network communication for the application, a data storage profile of characteristics of data storage for the infrastructure, and an application profile defined collectively by the other profiles, by:
training a classifier to generate a first classification using training data sets based on application profiles so as to classify an application profile as underperforming;
training the classifier to generate a set of second classifications and a set of third classifications using training data sets based at least one of:
an application profile, a hypervisor profile, a network communication profile, or a data storage profile,
wherein the classifications in the second set classify a profile for which optimization will provide improved application performance, and
wherein the classifications in the third set classify a profile for which additional infrastructure resource is required to provide improved application performance; and
in response to applying the first classifications, the second classifications and the third classifications to data sets based on the application profile, implementing one or more of the following for the application:
optimization of a hypervisor, network or data storage, or
deploying an additional resource for the hypervisor, network or data storage.

13. A non-transitory computer-readable storage medium storing a computer program element comprising computer program code to, when loaded into a computer system and executed thereon, cause the computer system to perform the method as claimed in claim 1.

* * * * *